United States Patent
Nilsson et al.

(10) Patent No.: US 9,509,546 B2
(45) Date of Patent: Nov. 29, 2016

(54) SEMI-POLAR MODULATOR

(71) Applicant: Telefonaktiebolaget L M Ericsson (publ), Stockholm (SE)

(72) Inventors: Magnus Nilsson, Lund (SE); Sami Vilhonen, Lieto (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/787,318

(22) PCT Filed: Apr. 30, 2014

(86) PCT No.: PCT/EP2014/058914
§ 371 (c)(1),
(2) Date: Oct. 27, 2015

(87) PCT Pub. No.: WO2014/177657
PCT Pub. Date: Nov. 6, 2014

(65) Prior Publication Data
US 2016/0119177 A1 Apr. 28, 2016

(30) Foreign Application Priority Data
Apr. 30, 2013 (EP) .................................... 13165924

(51) Int. Cl.
*H04L 27/36* (2006.01)
(52) U.S. Cl.
CPC .................................. *H04L 27/361* (2013.01)
(58) Field of Classification Search
CPC ... H04L 27/01; H04L 27/36; H04L 27/2627; H04L 27/12; H04B 1/02; H04B 1/04; H04B 14/00; H04B 14/008; H03C 5/00; H03C 3/02; H03C 3/095; H03C 3/40
USPC .................. 375/353, 259, 295, 296
See application file for complete search history.

(56) References Cited

U.S. PATENT DOCUMENTS

| | | | |
|---|---|---|---|
| 7,126,999 B2 | 10/2006 | Dent | |
| 2010/0105341 A1* | 4/2010 | Chen | H03C 5/00 455/102 |
| 2013/0022148 A1* | 1/2013 | Sagi | H04L 27/361 375/296 |

FOREIGN PATENT DOCUMENTS

| | | |
|---|---|---|
| EP | 2242227 A1 | 10/2010 |
| EP | 2627053 A1 | 8/2013 |
| WO | 2010119047 A1 | 10/2010 |

OTHER PUBLICATIONS

Boos, Z. et al. "A Fully Digital Multimode Polar Transmitter Employing 17b RF DAC in 3G Mode", IEEE Solid-State Circuits Conference Digest of Technical Papers (ISSCC), IEEE International Rfic Virtual Journal, Feb. 23, 2011, pp. 376-378, IEEE.

Bogdan Staszewski, R., et al., "Spur-Free All-Digital PLL in 65 nm for Mobile Phones",2011 IEEE International Solid-State Circuits Conference Digest of Technical Papers (ISSCC), 2011-0221, pp. 52-54, IEEE.

Fukuda, S. et al., "Direct-Digital Modulation (DIDIMO) Transmitter with -156dBc/Hz Rx-Band Noise using FIR structure", 2012 Proceedings of the ESSCIRC (ESSCIRC), 2012-09-17, pp. 53-56, IEEE.

Zhuang, J. et al.,"A Technique to Reduce Phase/Frequency Modulation Bandwidth in a Polar RF Transmitter", IEEE Transactions on Circuits and Systems I: Regular Papers, Jan. 8, 2010, pp. 2196-2207, vol. 57 , Issue: 8, IEEE.

* cited by examiner

*Primary Examiner* — Siu Lee
(74) *Attorney, Agent, or Firm* — Coats & Bennett, PLLC

(57) ABSTRACT

A modulation processor (500) comprises a first processing stage (110) and a second processing stage (120). The first processing stage (110) comprises a phase generation stage (117) arranged to generate a phase signal (PM) indicative of a phase of a modulation signal (S), a differentiation stage (118) arranged to generate a frequency signal (FM) by differentiating the phase signal (PM), and a first bandwidth reduction stage (113) arranged to generate a first output signal (FM_LP) by reducing a bandwidth of the frequency signal (FM). The second processing stage (120) is arranged to generate a second output signal (AM*) proportional to the modulation signal (S) with its phase retarded by an angle equal to an integral of the first output signal (FM_LP).

15 Claims, 10 Drawing Sheets

SEMI-POLAR MODULATOR

FIELD OF THE DISCLOSURE

The present disclosure relates to a modulation processor, a modulator comprising the modulation processor, a transmitter comprising the modulator, a wireless communication device comprising the transmitter, a method of operating a modulation processor, a computer program code arranged to perform the method of operating a modulation processor, and a method of operating a modulator.

BACKGROUND TO THE DISCLOSURE

The polar modulator is a good architecture for a radio transmitter when moving to more digitally intensive implementations. A transmitter for the Global System for Mobile Communications (GSM) and for Enhanced Data rates for GSM Evolution (EDGE), and comprising a polar modulator, is disclosed in "Spur-free all-digital PLL in 65 nm for Mobile Phones", B. Staszewski et al, IEEE International Solid State Circuits Conference, session 3.1, 2011. A transmitter for Wideband Code Division Multiple Access (WCDMA), and comprising a polar modulator, is disclosed in "A fully digital multimode polar transmitter employing 17b RF DAC in 3G mode", Z. Boos et al, IEEE International Solid State Circuits Conference, session 21.7, 2011. Such polar transmitters can be very power efficient. However, they are less well suited to use in wider band radio systems such as the Third Generation Partnership Project Long Term Evolution, referred to, for brevity, as LTE.

A problem with polar transmitters is that the bandwidth of the phase and amplitude modulation signals used for modulating the transmitter is much wider than the bandwidths of in-phase and quadrature-phase components (I/Q) of a modulation signal. Typically the bandwidth required to achieve good Adjacent Channel Leakage Ratio (ACLR) and Error Vector Magnitude (EVM) performance in a polar transmitter is three to four times higher than in a transmitter implementing modulation by means of in-phase and quadrature-phase components.

An additional problem with a polar transmitter is that if band-limiting the phase and amplitude modulation signals, the composite signal has higher bandwidth than the bandwidth of the phase and amplitude signals. This is because the amplitude and phase modulation signals are multiplied during modulation of the carrier signal, which is equivalent to convolution in the frequency domain.

This is especially a problem with systems such as LTE, which have a high modulation bandwidth. It is important in frequency division duplex (FDD) systems, such as LTE, as well as WCDMA, that the transmitter of a wireless communication device does not desensitise the receiver of the same device. A low ratio of duplex distance to modulation bandwidth can present a challenge. In WCDMA, the worst ratio of duplex distance to modulation bandwidth occurs when the duplex distance is 45 MHz and the modulation bandwidth is 3.84 MHz. In LTE, the worst ratio of duplex distance to modulation bandwidth occurs when the duplex distance is 80 MHz and the modulation bandwidth is 18 MHz. Therefore, in LTE the worst ratio of duplex distance to modulation bandwidth is 2.6 times smaller than in WCDMA, making it very challenging to build a polar modulator.

Another challenge when building a polar modulator for LTE is the very high frequency deviation required in a 2-point phase locked loop (PLL). In WCDMA, the required deviation is about ±10 MHz, and in LTE it is ±50 MHz. It is very challenging to generate such a wide linear tuning range, and also a wide deviation reduces the available tuning range, limiting the ability to support multiple frequency bands using one digitally controlled oscillator (DCO).

Yet another challenge with polar modulation is the time alignment requirement. When combining the amplitude and phase modulation signals, the timing must be very accurate, otherwise spectral growth and violation of transmitter ACLR and the receiver band noise requirements will occur.

SUMMARY OF THE PREFERRED EMBODIMENTS

According to a first aspect there is provided a modulation processor comprising a first processing stage and a second processing stage; wherein the first processing stage comprises:

a phase generation stage arranged to generate a phase signal indicative of a phase of a modulation signal;

a differentiation stage arranged to generate a frequency signal by differentiating the phase signal; and a first bandwidth reduction stage arranged to generate a first output signal by reducing a bandwidth of the frequency signal; and wherein the second processing stage is arranged to generate a second output signal proportional to the modulation signal with its phase retarded by an angle equal to an integral of the first output signal.

According to a second aspect there is provided a method of operating a modulation processor, comprising:

generating a phase signal indicative of a phase of a modulation signal;

generating a frequency signal by differentiating the phase signal;

generating a first output signal by reducing a bandwidth of the frequency signal; and generating a second output signal (AM*) proportional to the modulation signal with its phase retarded by an angle equal to an integral of the first output signal.

The modulation processor, which may also be referred to as a modulation generator, and method of operating a modulation processor, which may also be referred to as a method of generating modulation, provide the first and second output signals which are suitable for modulating the amplitude and frequency of a carrier signal using a modulation stage having a polar architecture, thereby enabling a 3 dB higher power efficient transmitter than the use of a quadrature modulator. The Effective Number Of Bits (ENOB) can be relaxed by 1.5 bits, compared with a quadrature modulator, due to not needing a sign bit and due to a 3 dB higher power efficiency, thereby reducing complexity and power consumption. The modulation processor and method of operating a modulation processor enable, compared with quadrature modulation, improved image rejection. This advantage is particularly beneficial where a small resource block (RB) is used in LTE.

By providing the first output signal having a reduced bandwidth, and the second output signal proportional to the modulation signal with its phase retarded by an angle equal to an integral of the first output signal, which can also contribute to a reduced bandwidth, an improved far-out noise performance can be enabled, whilst maintaining a good EVM and ACLR performance. The reduction in bandwidth can simplify implementation of a transmitter and reduce the bandwidth of a transmitter employing the modulation processor, reducing the peak frequency deviation and enabling a smaller duplex distance to be used in a wireless communication apparatus, and can increase the tolerance to timing mismatch between the amplitude and frequency, or phase, components, that is, the first and second output signals. More particularly, reducing the bandwidth of the frequency signal can reduce the peak frequency deviation required in a transmitter. This can relax the ENOB required in a modulation stage, and also increase the tuning range by reducing the modulation bandwidth required in a modulation stage. Furthermore, the reduced bandwidth can enable a less stringent timing accuracy between the first and second output signals. Generating and employing the second output signal proportional to the modulation signal with its phase retarded by an angle equal to an integral of the first output signal can improve noise performance, by reducing spectral energy at high frequency.

The phase generation stage may be arranged to generate the phase signal from an in-phase component and a quadrature-phase component of the modulation signal. Likewise, the method of operating a modulation processor may comprise generating the phase signal from an in-phase component and a quadrature-phase component of the modulation signal. This feature provides a low complexity way of generating the phase signal.

In an embodiment of the modulation processor, the first processing stage may comprise:

an amplitude generation stage arranged to generate an amplitude signal indicative of an amplitude of the modulation signal; and a second bandwidth reduction stage arranged to provide a band-limited amplitude signal by reducing a bandwidth of the amplitude signal;

wherein the second processing stage comprises:

a regeneration stage arranged to provide a regenerated modulation signal proportional to the band-limited amplitude signal with its phase advanced by an angle equal to the integral of the first output signal;

an error generation stage arranged to generate an error signal indicative of a difference between the modulation signal and the regenerated modulation signal;

a rotation stage arranged to provide a rotated error signal by retarding a phase of the error signal by an angle equal to the integral of the first output signal; and a summing stage arranged to sum the band-limited amplitude signal and a real part of the rotated error signal;

wherein the second processing stage is arranged to deliver the second output signal having a real part comprising the sum of the band-limited amplitude signal and the real part of the rotated error signal, and an imaginary part comprising an imaginary part of the rotated error signal.

Likewise, an embodiment of the method of operating a modulation processor may comprise:

generating an amplitude signal indicative of an amplitude of the modulation signal;

providing a band-limited amplitude signal by reducing a bandwidth of the amplitude signal;

providing a regenerated modulation signal having an amplitude dependent on the band-limited amplitude signal and a phase equal to an integral of the first output signal;

generating an error signal indicative of a difference between the modulation signal and the regenerated modulation signal;

providing a rotated error signal by retarding a phase of the error signal by an angle equal to the integral of the first output signal;

summing the band-limited amplitude signal and a real part of the rotated error signal; and delivering the second output signal having a real part comprising the sum of the band-limited amplitude signal and the real part of the rotated error signal, and an imaginary part comprising an imaginary part of the rotated error signal.

This embodiment can entail rotating only the error signal, rather than the modulation signal, Consequently, a smaller dynamic range can be used for the rotation, and therefore fewer bits can be used when the rotation is performed in the digital domain.

The amplitude generation stage may be arranged to generate the amplitude signal from an/the in-phase component and a/the quadrature-phase component of the modulation signal. Likewise, the method of operating a modulation processor may comprise generating the amplitude signal from an/the in-phase component and a/the quadrature-phase component of the modulation signal. This feature provides a low complexity way of generating the amplitude signal.

The modulation processor may comprise a first digital-to-analogue converter, DAC, arranged to convert a real part of the second output signal from the digital domain to the analogue domain, and a second DAC arranged to convert an imaginary part of the second output signal from the digital domain to the analogue domain, wherein the second DAC may have a dynamic range smaller than a dynamic range of the first DAC. Likewise, the method of operating a modulation processor may comprise converting a real part of the second output signal from the digital domain to the analogue domain by means of a first DAC, and converting an imaginary part of the second output signal from the digital domain to the analogue domain by means of a second DAC, wherein the second DAC may have a dynamic range smaller than a dynamic range of the first DAC. This feature enables separate DACs to be optimised for the real and imaginary parts of the second output signal to be converted from the digital domain to the analogue domain. In particular, the second DAC having a dynamic range smaller than a dynamic range of the first DAC can enable complexity and power consumption to be reduced, and reduced silicon area when the modulation processor is implemented in an integrated circuit. Alternatively, the second DAC may have a dynamic range equal to a dynamic range of the first DAC. This feature can enhance versatility, enabling the modulation processor to be operable in an alternative mode, for example generating analogue domain quadrature modulation signal components as an alternative to the first and second output signals.

Alternatively, the modulation processor may comprise:

a first DAC arranged to convert the real part of the rotated error signal from the digital domain to the analogue domain;

a second DAC arranged to convert the imaginary part of the rotated error signal from the digital domain to the analogue domain;

a third DAC arranged to convert the band-limited amplitude signal from the digital domain to the analogue domain;

wherein the summing stage is coupled to the first and third DACs and is arranged to sum the band-limited amplitude signal and the real part of the rotated error signal in the analogue domain; and wherein the first and second DACs have a dynamic range smaller than a dynamic range of the third DAC.

Likewise, the method of operating a modulation processor may comprise:

converting the real part of the rotated error signal from the digital domain to the analogue domain by means of a first DAC;

converting the imaginary part of the rotated error signal from the digital domain to the analogue domain by means of a second DAC;

converting the band-limited amplitude signal from the digital domain to the analogue domain by means of a third DAC; and performing the summing of the band-limited amplitude signal and the real part of the rotated error signal in the analogue domain;

wherein the first and second DACs have a dynamic range smaller than a dynamic range of the third DAC.

This alternative can enable improved efficiency by enabling digital-to-analogue conversion to be optimised separately for the band-limited amplitude signal, which can be relatively large, real and positive, and the real and imaginary parts of the rotated error signal, which can be relatively small and have both positive and negative values. In particular, the first and second DACs may have a dynamic range smaller than a dynamic range of the third DAC.

There is also provided a modulator comprising the modulation processor according to the first aspect, and a modulation stage arranged to modulate a frequency of a carrier signal dependent on the first output signal and arranged to modulate the amplitude of the carrier signal dependent on the second output signal.

There is also provided a method of operating a modulator, comprising operating a modulation processor according to the second aspect, modulating the frequency of a carrier signal dependent on the first output signal, and modulating the amplitude of the carrier signal dependent on the second output signal.

The first bandwidth reduction stage may be arranged for reducing the bandwidth of the frequency signal by filtering the frequency signal. Similarly, the second bandwidth reduction stage may be arranged for reducing the bandwidth of the amplitude signal by filtering the amplitude signal. Likewise, in the method of operating a modulation processor, reducing the bandwidth of the amplitude signal may comprise filtering the amplitude signal and reducing the bandwidth of the frequency signal may comprise filtering the frequency signal. Such filtering provides a low complexity way of bandwidth reduction.

In an alternative embodiment, the first bandwidth reduction stage may be arranged for reducing the bandwidth of the amplitude signal by altering a waveform of the amplitude signal. Similarly, the second bandwidth reduction stage may be arranged for reducing the bandwidth of the frequency signal by altering a waveform of the frequency signal. Likewise, the method of operating a modulation processor may comprise reducing the bandwidth of the amplitude signal by altering a waveform of the amplitude signal. Similarly, the method of operating a modulation processor may comprise reducing the bandwidth of the frequency signal by altering a waveform of the frequency signal. Such adjustment of the amplitude signal and the frequency signal can enable improved bandwidth reduction.

There is also provided a computer program product comprising computer program code embodied in a computer-readable storage medium, wherein the computer program code is arranged for performing the method according to the second aspect when executed on a processor.

There is also provided a transmitter comprising the modulator according to the third aspect. There is also provided a wireless communication device comprising the transmitter.

BRIEF DESCRIPTION OF THE DRAWINGS

Preferred embodiments will now be described, by way of example only, with reference to the accompanying drawings, in which.

DETAILED DESCRIPTION OF PREFERRED EMBODIMENTS

Figure 1:
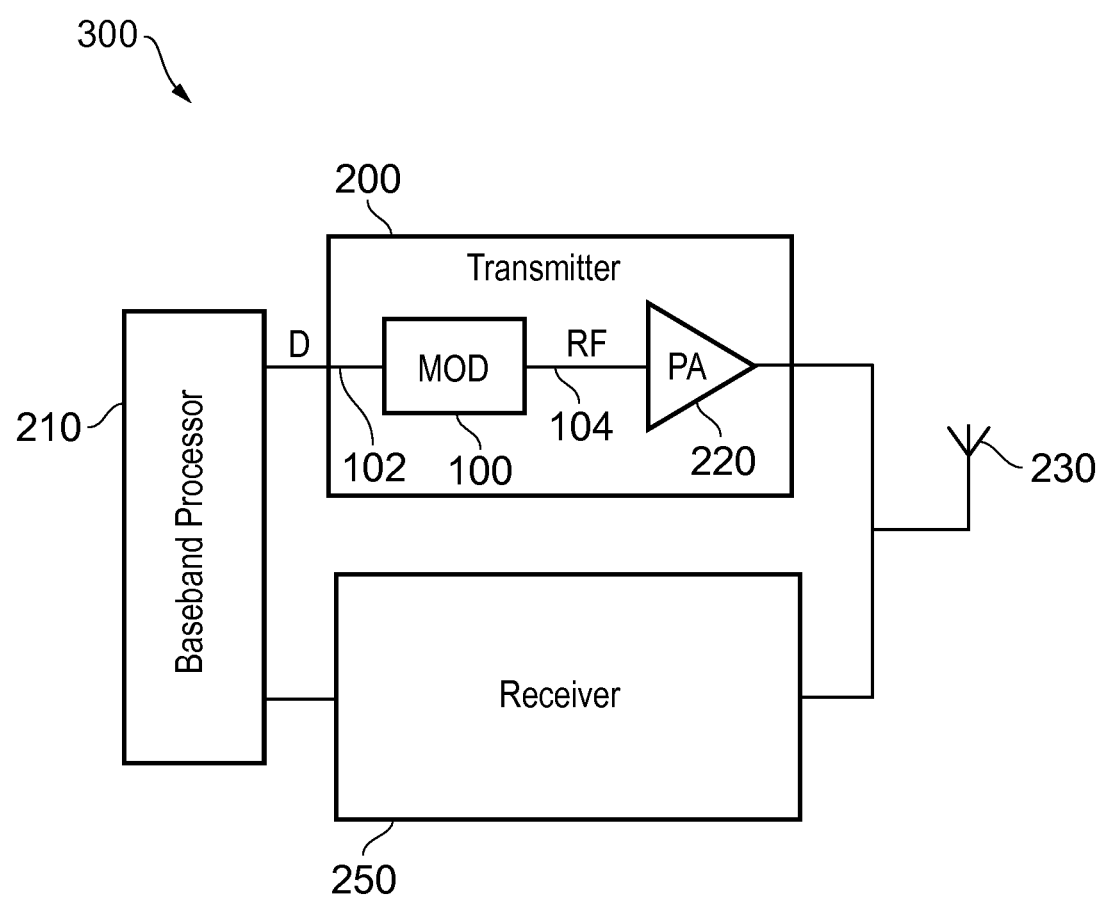
FIG. 1 is a block schematic diagram of a wireless communication device.

Referring to FIG. 1, a wireless communication device 300, which may be for example a mobile telephone, comprises a baseband processor 210 for generating modulation data D containing information to be transmitted by a transmitter 200 via an antenna 230, and for processing a received signal received by a receiver 250 via the antenna 230. The transmitter 200 comprises a modulator (MOD) 100 and a power amplifier (PA) 220. An input 102 of the modulator 100 is coupled to the baseband processor 210 for receiving the modulation data D. An output 104 of the modulator 100 delivers a modulated carrier signal RF, which is modulated by the information to be transmitted. The output 104 of the modulator 100 is coupled to the antenna 230 by means of the PA 220. The baseband processor 210 is coupled the antenna 230 by means of the receiver 250 for receiving the received signal.

Figure 2:
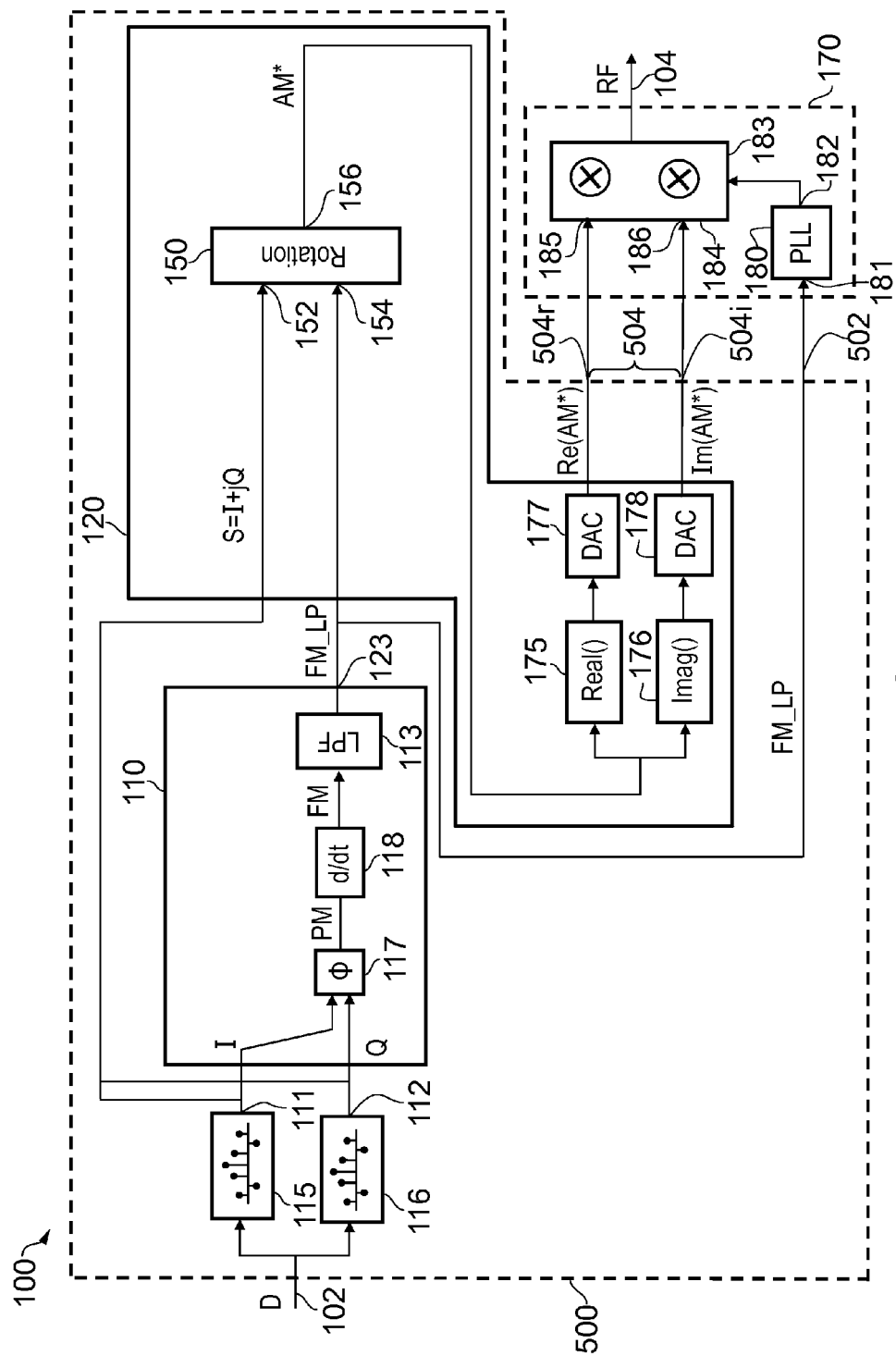
FIG. 2 is a block schematic diagram of a modulator comprising a first embodiment of a modulation processor and a modulation stage.

Referring to FIG. 2, the modulator 100 comprises a modulation processor 500 and a modulation stage 170. The modulation data D delivered at the input 102 of the modulator 100 from the baseband processor 210 comprises symbols, and the modulation processor 500 comprises first and second pulse shaping filter (PSF) stages 115, 116 coupled to the input 102 of the modulator 100 for generating, respectively, an in-phase component I and a quadrature-phase component Q of the modulation signal S from the modulation data D. Therefore, the modulation signal S may be regarded as a complex quantity, or complex signal, with the in-phase component I forming a real part and the quadrature-phase component Q forming an imaginary part, that is, S=I+jQ. The PSF stages 115, 116 may operate at a relatively low speed, their rate being dependent on the required bandwidth of the in-phase component I and the quadrature-phase component Q of the modulation signal S.

The modulation processor 500 also comprises a first processing stage 110 and a second processing stage 120. The first processing stage 110 comprises a phase generation stage 117 coupled to respective outputs 111, 112 of the first and second PSF stages 115, 116 for receiving the in-phase component I and the quadrature-phase component Q of the modulation signal S. The phase generation stage 117 generates a phase signal PM that is indicative of a phase of the modulation signal S. In particular, the phase signal PM may represent the phase φ of the modulation signal S, where φ=arctan(Q/I). The bandwidth of the phase signal PM is relatively wide, since passage of a phase trajectory of the modulation signal S through the origin causes a phase shift of 180 degrees. A differentiation stage 118 is coupled to an output of the phase generation stage 117 for receiving the phase signal PM, and generates a frequency signal FM by differentiating the phase signal PM.

A first bandwidth reduction stage 113 is coupled to the differentiation stage 118 for receiving the frequency signal FM, and generates a first output signal FM_LP by reducing the bandwidth of the frequency signal FM. The first output signal FM_LP may also be referred to as a band-limited frequency signal. The first bandwidth reduction stage 113 may generate the first output signal FM_LP by low-pass filtering the frequency signal FM, and/or using other methods of altering a waveform of the frequency signal FM to prevent fast changes, such as an origin avoidance method as disclosed in EP2242227, thereby providing the first output signal FM_LP. An output of the first bandwidth reduction stage 113 is coupled to a first output 123 of the first processing stage 110 for delivering the first output signal FM_LP.

An embodiment of the second processing stage 120 illustrated in FIG. 2 comprises a rotation stage 150 having a first input 152 coupled to the respective outputs 111, 112 of the first and second PSF stages 115, 116 for receiving the modulation signal S, in the form of the in-phase component I and the quadrature-phase component Q of the modulation signal S, and a second input 154 coupled to the first output 123 of the first processing stage 110 for receiving the first output signal FM_LP. The rotation stage 150 generates a second output signal AM* which is proportional to the modulation signal S with its phase retarded by an angle equal to an integral of the first output signal FM_LP. More specifically, the rotation stage 150 may generate the second output signal AM* which is proportional to, or equal to, the modulation signal S with its phase retarded by an angle θ, where θ=∫(FM_LP)dt, and the integration is performed with respect to time. Therefore, the second output signal AM* may be expressed as $S \cdot e^{-j\theta}$, where S represents the modulation signal.

The second processing stage 120 also comprises first and second decomposition stages 175, 176, and first and second digital-to-analogue converters (DACs) 177, 178. An output 156 of the rotation stage 150 is coupled to the first decomposition stage 175 which determines the real part of the second output signal AM*, and to the second decomposition stage 176 which determines the imaginary part of the second output signal AM*. The second output signal AM* may be in the form of a two-dimensional vector, and the first and second decomposition stages 175, 176 may extract the respective real and imaginary parts of the second output signal AM* from the two-dimensional vector. An output of the first decomposition stage 175 is coupled to a first constituent output 504r of a port 504 of the modulation processor 500 by means of the first DAC 177, for converting the real part of the second output signal AM*, denoted Re(AM*) in FIG. 2, from the digital domain to the analogue domain, and delivering the real part of the second output signal AM* to the first constituent output 504r. An output of the second decomposition stage 176 is coupled to a second constituent output 504i of the port 504 of the modulation processor 500 by means of the second DAC 178, for converting the imaginary part of the second output signal AM*, denoted Im(AM*) in FIG. 2, from the digital domain to the analogue domain, and delivering the imaginary part of the second output signal AM* to the second constituent output 504i.

The first output 123 of the first processing stage 120 is also coupled to a third output 502 of the modulation processor 500 for delivering the first output signal FM_LP.

The first constituent output 504r of the port 504 of the modulation processor 500 is coupled to a first input 185 of a quadrature modulator 184, and the second constituent output 504i of the port 504 of the modulation processor 500 is coupled to a second input 186 of the quadrature modulator 184. The third output 502 of the modulation processor 500 is coupled to an input 181 of a phase locked loop (PLL) 180 that modulates the frequency of a carrier signal by the first output signal FM_LP to provide a frequency modulated carrier signal at an output 182 of the PLL 180. The output 182 of the PLL 180 is coupled to a third input 183 of the quadrature modulator 184. The quadrature modulator 184 modulates the amplitude of the carrier signal, or more specifically the frequency modulated carrier signal, by the real and imaginary parts of the second output signal AM*, and delivers an amplitude and frequency modulated carrier signal RF at an output of the quadrature modulator 184 which is coupled to the output 104 of the modulator 100. The PLL 180 and the quadrature modulator 184 are elements of a modulation stage 170.

The first and second PSF stages 115, 116, the first processing stage 110, the rotation stage 150, and the first and second decomposition stages 175, 176 may be implemented in digital circuitry, for example in a digital processor, and the first and second DACs 177, 178 and modulation stage 170 may be implemented in analogue circuitry. Moreover, the first and second PSF stages 115, 116, the first processing stage 110, the rotation stage 150, and the first and second decomposition stages 175, 176 may be implemented in a computer program product comprising computer program code embodied in a computer-readable storage medium.

Figure 3:
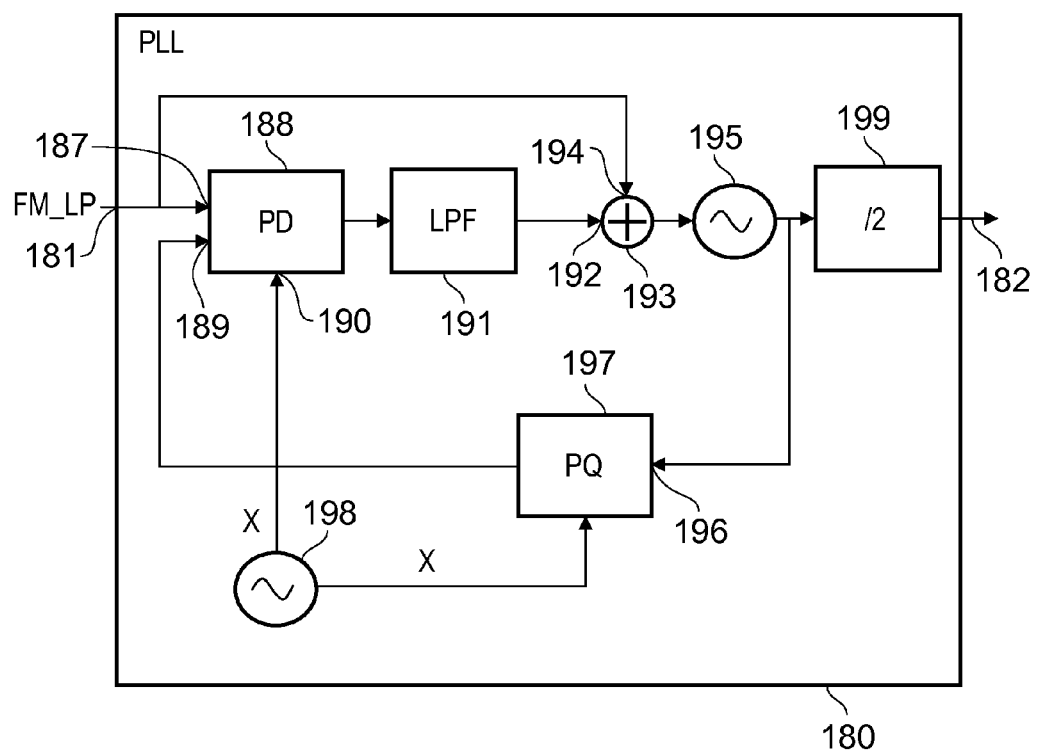
FIG. 3 is a block schematic diagram of a phase locked loop.

FIG. 3 illustrates an embodiment of the phase locked loop 180 that is arranged for two point modulation, although other embodiments may alternatively be used. Referring to FIG. 3, the input 181 of the PLL 180 is coupled to a first input 187 a phase detector (PD) 188. An output of a reference oscillator 198, which delivers a reference signal X, is coupled to a second input 190 of the phase detector 188 for clocking the phase detector 188. An output of the phase detector 188 is coupled by means of a loop filter 191 to a first input 192 of an adder 193. A second input 194 of the adder 193 is coupled to the input 181 of the phase locked loop 180 for receiving the first output signal FM_LP. In this way, the first output signal FM_LP is applied to both the phase detector 188 and the adder 193. An output of the adder 193 is coupled to a control input of a digitally controlled oscillator (DCO) 195 for controlling a frequency of a DCO signal. An output of the DCO 195 delivers the DCO signal and is coupled to a first input 196 of a phase quantisation (PQ) stage 197. A second input of the PQ stage 197 is coupled to the reference oscillator 198 for receiving the reference signal X for clocking the PQ stage 197. The PQ stage 197 generates an indication of the phase, or time, difference between the DCO signal delivered at the output of the DCO 195 and the reference signal X generated by the reference oscillator 198. An output of the PQ stage 197, indicating this phase difference, is coupled to a third input 189 of the phase detector 188. The phase detector 188 subtracts the indicated phase difference from the first output signal FM_LP. The output of the DCO 195 is also coupled to the output 182 of the PLL 180 by means of a frequency divider 199, performing division by two, thereby delivering the frequency modulated carrier signal at the output 182 of the PLL 180.

Figure 4:
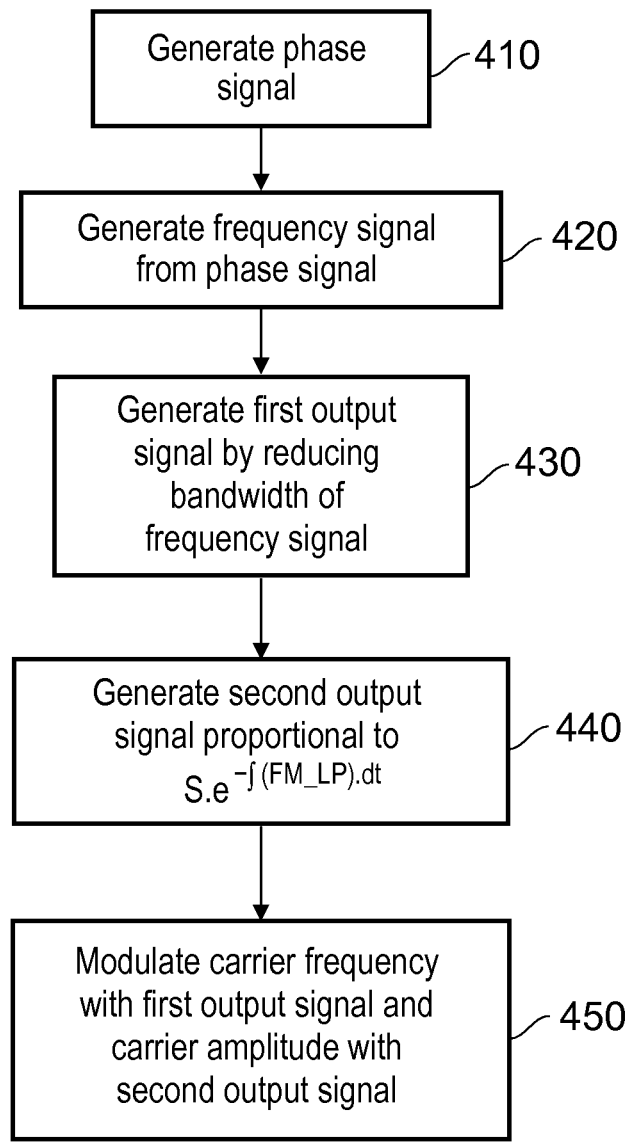
FIG. 4 is a flow chart of a method of operating a modulator, which comprises a method of operating a modulation processor.

Referring to FIG. 4, a method of operating a modulator, such as the embodiments of the modulator 100 described herein, commences at step 410 by generating, from the in-phase and quadrature-phase components I, Q of the modulation signal S, the phase signal PM indicative of the phase of the modulation signal S. At step 420, the frequency signal FM is generated by differentiating the phase signal PM.

At step 430 of FIG. 4, the first output signal FM_LP is provided by reducing the bandwidth of the frequency signal FM. This bandwidth reduction is performed in order to reduce the high frequency power of the amplitude and frequency modulated carrier signal RF, for example in a receive frequency band of the receiver 250, and may be performed by filtering, or by other techniques such as the origin avoidance scheme disclosed in EP 2242227, or a combination of these techniques.

At step 440, the second output signal AM* is generated which is proportional to, and more specifically may be equal to, the modulation signal S with its phase retarded by an angle equal to an integral of the first output signal FM_LP. This may be performed by rotating, or more specifically retarding, the phase of the modulation signal S by an angle equal to the integral of the first output signal. Therefore, the second output signal AM* may be represented as $S \cdot e^{j\theta}$ where $\theta = \int(FM\_LP)dt$, S represents the modulation signal, FM_LP represents the first output signal FM_LP, and the integration is performed with respect to time.

The steps 410 to 440 may be implemented by the embodiments of the modulation processor 500 described herein, or in computer program code embodied in a computer-readable storage medium. Indeed, steps 410 to 440, as a subset of the method of operating a modulator, together constitute a method of operating a modulation processor, such as the modulation processor 500.

At step 450, in the modulation stage 170, the frequency of the carrier signal is modulated dependent on the first output signal FM_LP and the amplitude of the carrier signal is modulated dependent on the second output signal AM*, or more specifically the real and imaginary parts of the second output signal AM*, to provide the modulated carrier signal RF.

Figure 5:
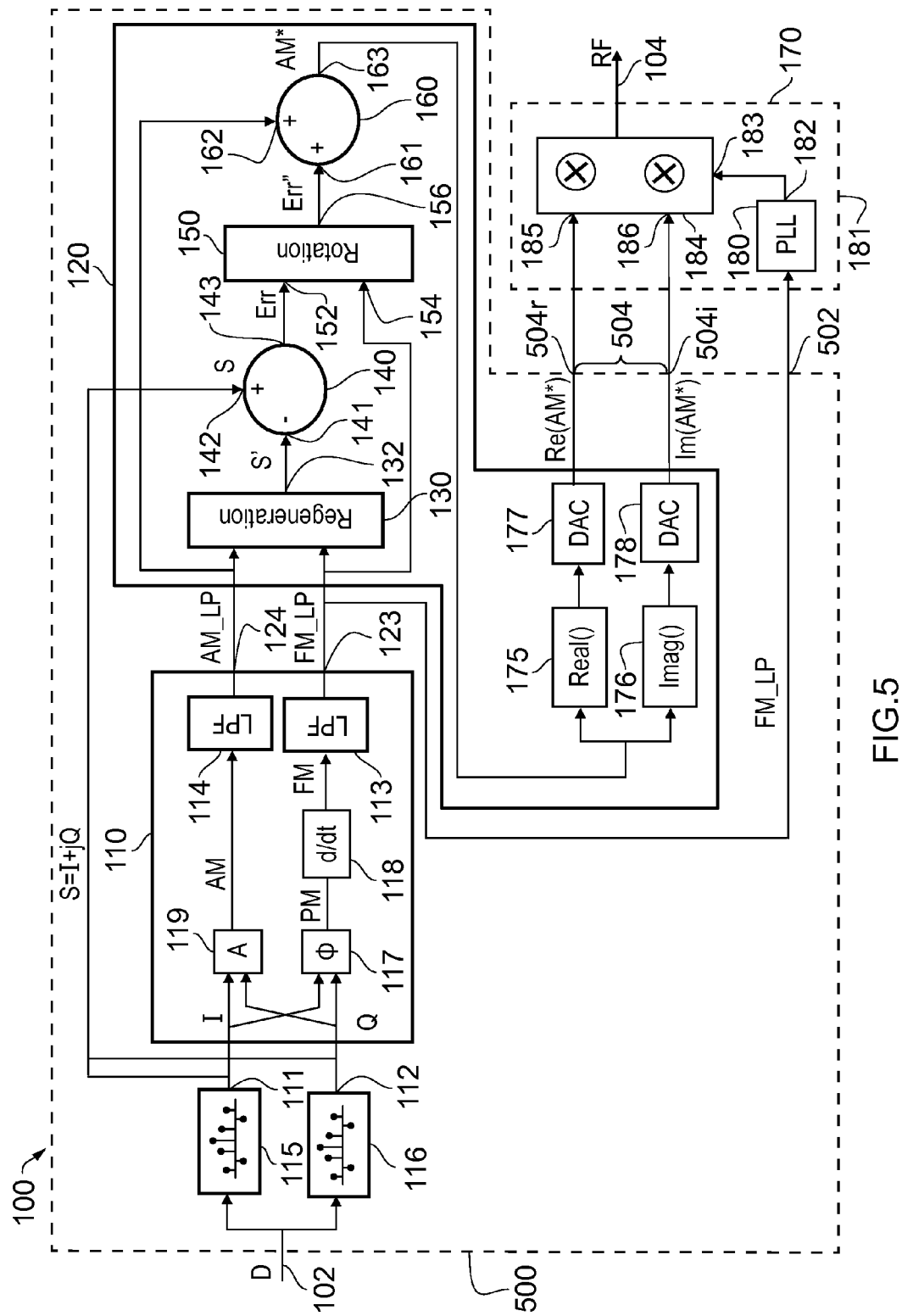
FIG. 5 is a block schematic diagram of another embodiment of a modulator comprising another embodiment of a modulation processor and a modulation stage.

Referring to FIG. 5, the modulator 100 comprises another embodiment of the modulation processor 500, which comprises the first and second PSF stages 115, 116 as described with reference to FIG. 2, and further embodiments of the first and second processing stages 110, 120.

Continuing to refer to FIG. 5, the first processing stage 110 comprises the phase generation stage 117, differentiation stage 118 and the first bandwidth reduction stage 113 arranged as described with reference to FIG. 2. In addition, the first processing stage 110 comprises an amplitude generation stage 119 coupled to the respective outputs 111, 112 of the first and second PSF stages 115, 116 for receiving the in-phase component I and the quadrature-phase component Q of the modulation signal S. The amplitude generation stage 119 generates an amplitude signal AM that is indicative of an amplitude of the modulation signal S. In particular, the amplitude signal AM may be determined as $\sqrt{(I^2 + Q^2)}$, where I and Q represent the in-phase and quadrature-phase components of the modulation signal S.

A second bandwidth reduction stage 114 is coupled to the amplitude generation stage 119 for receiving the amplitude signal AM, and generates a band-limited amplitude signal AM_LP by reducing the bandwidth of the amplitude signal AM. The second bandwidth reduction stage 114 may generate the band-limited amplitude signal AM_LP by low-pass filtering the amplitude signal AM, and/or using other methods of altering a waveform of the amplitude signal AM to prevent fast changes, such as an origin avoidance method as disclosed in EP2242227, thereby providing the band-limited amplitude signal AM_LP. An output of the second bandwidth reduction stage 114 is coupled to a second output 124 of the first processing stage 110 for delivering the band-limited amplitude signal AM_LP.

The embodiment of the second processing stage 120 illustrated in FIG. 5 comprises a regeneration stage 130 coupled to the first and second outputs 123, 124 of the first processing stage 110 and provides at an output 132 of the regeneration stage 130 a regenerated modulation signal S' by combining the band-limited amplitude signal AM_LP and the first output signal FM_LP. The regenerated modulation signal S' has an amplitude dependent on the band-limited amplitude signal AM_LP, and a frequency, or equivalently phase, dependent on the first output signal FM_LP. More specifically, the phase θ of the regenerated modulation signal S' may be dependent on an integral of the first output signal FM_LP. The regenerated modulation signal S' may be represented as $$S' = AM\_LP \cdot e^{j\theta} \qquad (1)$$

where $\theta = \int(FM\_LP)dt$, where the integration is with respect to time. Therefore, the regenerated modulation signal S' is proportional to, and more specifically may be equal to, the band-limited amplitude signal with its phase advanced by the angle θ. The output 132 of the regeneration stage 130 is coupled to a first input 141 of an error generation stage 140. A second input 142 of the error generation stage 142 is coupled to the respective outputs 111, 112 of the first and second PSF stages 115, 116 for receiving the modulation signal S in the form of the in-phase component I and the quadrature-phase component Q.

The error generation stage 140 generates an error signal Err by determining the difference between the modulation signal S and the regenerated modulation signal S'. Therefore, the error signal Err may be represented as S-S', where the regenerated modulation signal S' may be represented by equation (1) and the modulation signal S may be represented as a complex quantity S=I+jQ, where j signifies the imaginary part. The error signal Err is delivered at an output 143 of the error generation stage 140, which is coupled to a first input 152 of a rotation stage 150. A second input of the rotation stage 150 is coupled to the first output 123 of the first bandwidth reduction stage 113 for receiving the band-limited frequency signal FM_LP.

The rotation stage 150 modifies the error signal Err by an amount dependent on the first output signal FM_LP. More specifically, the rotation stage 150 modifies the phase of the error signal Err by an angle dependent on the first output signal FM_LP, and in particular retards the phase of the error signal Err by an angle dependent on an integral of the first output signal FM_LP, to provide a rotated error signal Err" at an output 156 of the rotation stage 150. The rotated error signal Err" may be represented as $$Err'' = Err \cdot e^{-j\int (FM\_LP)dt} \qquad (2)$$
$$= Err \cdot e^{-j\theta}$$

The output 156 of the rotation stage 150 is coupled to a first input 161 of a summing stage 160, and a second input 162 of the summing stage 160 is coupled to the second output 124 of the first processing stage 110 for receiving the band-limited amplitude signal AM_LP. The summing stage 160 generates the second output signal AM*, which it delivers at an output 163 of the summing stage 160, by summing the band-limited amplitude signal AM_LP and the rotated error signal Err". The band-limited amplitude signal AM_LP is a real quantity, and the rotated error signal Err" is a complex signal having real and imaginary parts, and so the second output signal AM* is also a complex signal having real and imaginary parts. As the band-limited amplitude signal AM_LP is real, the summing stage 160 may sum the band-limited amplitude signal AM_LP and the rotated error signal Err" by merely summing the band-limited amplitude signal AM_LP and the real part of the rotated error signal Err", and passing the imaginary part of the rotated error signal Err" unchanged. The sum, and the imaginary part of the rotated error signal Err" together form the second output signal AM*.

The output 163 of the summing stage 160 is coupled to a first decomposition stage 175 which determines the real part of the second output signal AM*, and to a second decomposition stage 176 which determines the imaginary part of the second output signal AM*. As in the case of the embodiment described with reference to FIG. 2, the second output signal AM* may be in the form of a two-dimensional vector, and the first and second decomposition stages 175, 176 may extract the respective real and imaginary parts of the second output signal AM* from the two-dimensional vector. An output of the first decomposition stage 175 is coupled to a first constituent output 504r of a port 504 of the modulation processor 500 by means of a first digital-to-analogue converter (DAC) 177, for delivering the real part of the second output signal AM*, denoted Re(AM*) in FIG. 5. An output of the second decomposition stage 176 is coupled to a second constituent output 504i of the port 504 of the modulation processor 500 by means of a second DAC 178, for delivering the imaginary part of the second output signal AM*, denoted Im(AM*) in FIG. 5.

The first output 123 of the first processing stage 110 is also coupled to a third output 502 of the modulation processor 500 for delivering the first output signal FM_LP.

In this embodiment, the real and imaginary parts of the rotated error signal Err" can be relatively small and may have positive or negative values, whereas the band-limited amplitude signal AM_LP is relatively large and can have only positive values. Consequently, the real part of the second output signal AM* can be relatively large and may have negative values, and the imaginary part of the second output signal AM* is relatively small and may also have negative values. Therefore, in the embodiment illustrated in FIG. 5, at least the first DAC 177 can have a relatively large dynamic range, the second DAC 178 may have a smaller dynamic range than the first DAC 177, and both the first and second DACs 177, 178 can accommodate positive and negative values.

In some embodiments, it can be advantageous for the second DAC 178 to also have a relatively large dynamic range, in particular the same dynamic range as the first DAC 177. This can be desirable where the modulation processor 500 is required to provide, in an alternative mode of operation, the modulation at the port 504 of the modulation processor 500 in an alternative form. For example, such an alternative form of the modulation may comprise the in-phase and quadrature-phase components of the modulation signal S. In this case, the in-phase component I and the quadrature-phase component Q of the modulation signal S are delivered directly from the first and second PSF stages 115, 116 to the first and second DACs 177, 178, and the PLL 182 generates a carrier signal at constant frequency.

The first constituent output 504r of the port 504 of the modulation processor 500 is coupled to a first input 185 of a quadrature modulator 184, and the second constituent output 504i of the port 504 of the modulation processor 500 is coupled to a second input 186 of the quadrature modulator 184. The third output 502 of the modulation processor 500 is coupled to an input 181 of a phase locked loop (PLL) 180 that modulates the frequency of a carrier signal by the first output signal FM_LP to provide a frequency modulated carrier signal at an output 182 of the PLL 180. The PLL 180 and the quadrature modulator 184 are elements of a modulation stage 170 as described with reference to FIG. 2, and are arranged in the same manner, and operate in the same manner, as described with reference to FIG. 2. The embodiment of the phase locked loop 180 described with reference to FIG. 3 may be employed as the phase locked loop 180 illustrated in FIG. 5.

In the embodiment of FIG. 5, the first stage 110, the regeneration stage 130, the error generation stage 140, the rotation stage 150, the summing stage 160 and the first and second decomposition stages 175, 176 may be implemented in digital circuitry, for example in a digital processor, and the first and second DACs 177, 178 and modulation stage 170 may be implemented in analogue circuitry. Moreover, the first processing stage 110, the regeneration stage 130, the error generation stage 140, the rotation stage 150, the summing stage 160 and the first and second decomposition stages 175, 176 may be implemented in a computer program product comprising computer program code embodied in a computer-readable storage medium.

Figure 6:
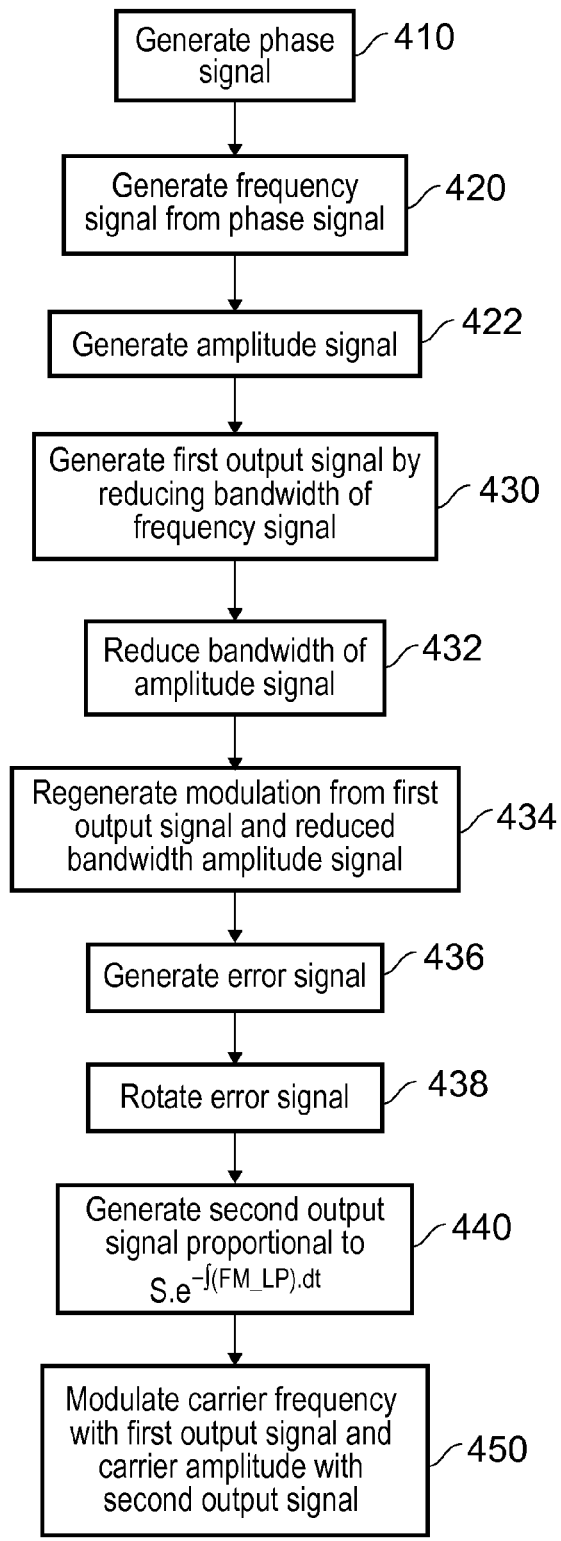
FIG. 6 is a flow chart of a method of operating the modulator of FIG. 5, which comprises a method of operating a modulation processor.

Referring to FIG. 6, a method of operating a modulator, such as the modulator 100 described with reference to FIG. 5, commences at step 410 by generating, from the in-phase and quadrature-phase components I, Q of the modulation signal S, the phase signal PM indicative of the phase of the modulation signal S. At step 420, the frequency signal FM is generated by differentiating the phase signal PM. At step 422, the amplitude signal AM is generated from the in-phase and quadrature-phase components I, Q of the modulation signal S. The amplitude signal AM is indicative of the amplitude of the modulation signal S, and may be determined as $\sqrt{(I^2+Q^2)}$, where I and Q represent the in-phase and quadrature-phase components of the modulation signal S.

Figure 7:
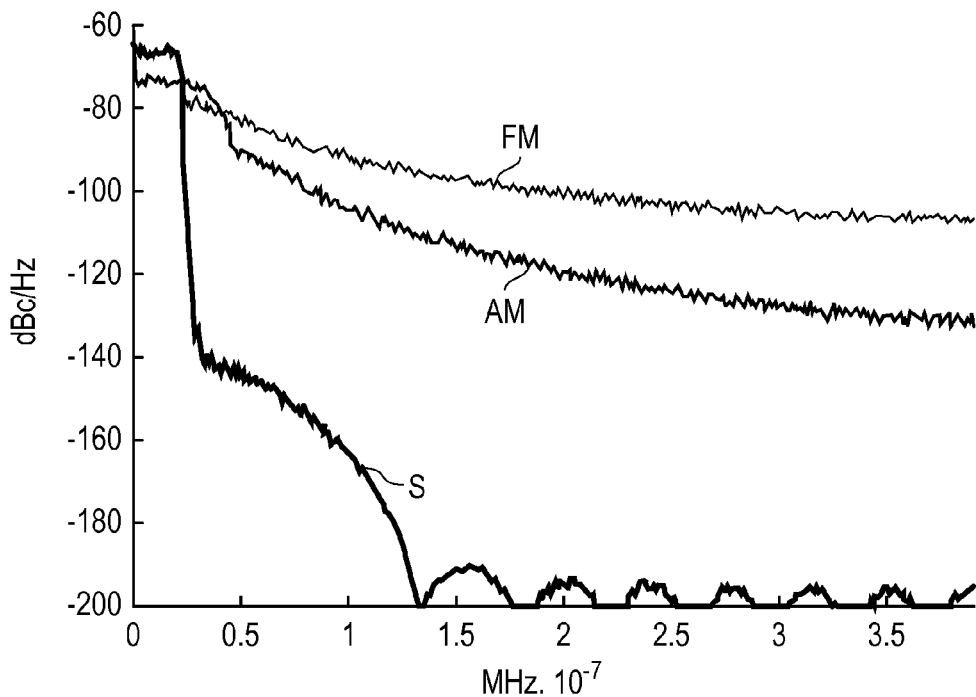
FIG. 7 is a graph illustrating spectra of a modulation signal and amplitude and frequency components of the modulation signal.

FIGS. 7 to 11 illustrate spectra for various signals related to LTE5, that is, LTE using a channel bandwidth of 5 MHz. In particular, FIG. 7 illustrates spectra of the modulation signal S and the amplitude and frequency signals AM, FM generated from the modulation signal S, where it can be seen that these signals have a relatively high power at high frequencies. In FIG. 7, the spectrum of the frequency signal FM is illustrated translated to a carrier frequency, as if it were frequency modulating the carrier signal in the PLL 180.

Figure 8:
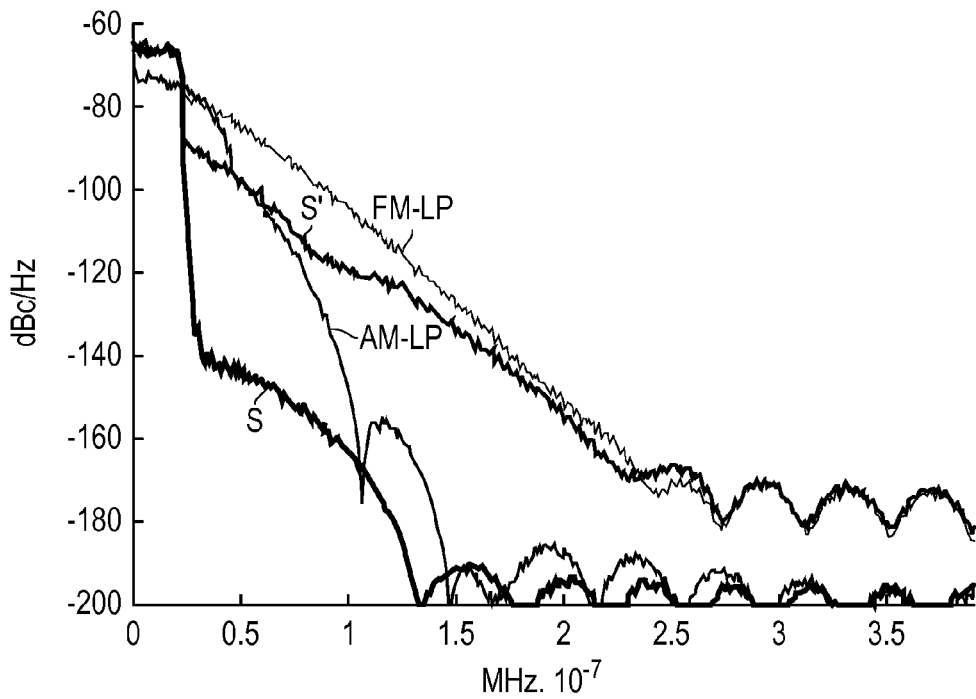
FIG. 8 is a graph illustrating spectra of: a modulation signal, a band-limited amplitude signal, a first output signal generated from the modulation signal, and a regenerated modulation signal obtained by combining the band-limited amplitude signal and the first output signal.

At step 430 of FIG. 6, the first output signal FM_LP is provided by reducing the bandwidth of the frequency signal FM, for example by filtering using a low-pass filter. At step 432 of FIG. 6, the band-limited amplitude signal AM_LP is provided by reducing the bandwidth of the amplitude signal AM. This bandwidth reduction is performed in order to reduce the high frequency power of the amplitude and frequency modulated carrier signal RF, for example in a receive frequency band of the receiver 250, and may be performed by filtering, or by other techniques such as the origin avoidance scheme disclosed in EP 2242227, or a combination of these techniques. FIG. 8 illustrates spectra of the modulation signal S, and the band-limited amplitude signal AM_LP and the first output signal FM_LP generated by low-pass filtering the amplitude and frequency signals AM, FM, where it can be seen that the high frequency power is reduced, relative to the high frequency power of the amplitude signal AM and the first output signal FM illustrated in FIG. 7. Such filtering, without further steps, will degrade the performance of the transmitter 200, such as its EVM or its ACLR. In FIG. 8, the spectrum of the first output signal FM_LP is illustrated after translation to the carrier frequency by frequency modulation of the carrier signal in the PLL 180, that is, the curve in FIG. 8 denoted FM_LP is the spectrum at the output 182 of the PLL 180.

At step 434 of FIG. 6, the regenerated modulation signal S' is provided which is proportional to the band-limited amplitude signal AM_LP with its phase advanced by an angle equal to an integral of the first output signal FM_LP, as represented by equation 1. FIG. 8 also illustrates the spectrum of the regenerated modulation signal S', which can be seen to fail to meet an LTE adjacent channel leakage ratio of −33 dBc, instead providing only −30 dBc.

At step 436, the error signal Err is generated, for example by the error generation stage 140, indicative of a difference between the modulation signal S and the regenerated modulation signal S'. Therefore, the error signal Err is indicative of the error introduced by reducing the bandwidth of the amplitude signal AM and the frequency signal FM. The error signal Err may be represented as $$Err = S - S'$$
$$= S - AM\_LP \cdot e^{j\theta}$$

At step 438, the rotated error signal Err" is provided by rotating, that is, modifying, a phase of the error signal Err by an angle dependent on the first output signal FM_LP, in particular by retarding the phase by an angle equal to the integral of the first output signal FM_LP. The rotated error signal Err" may be represented as $$Err'' = Err \cdot e^{-j\theta} \qquad (3)$$
$$= S \cdot e^{-j\theta} - AM\_LP \cdot e^{j\theta} e^{-j\theta}$$
$$= S \cdot e^{-j\theta} - AM\_LP$$

Figure 9:
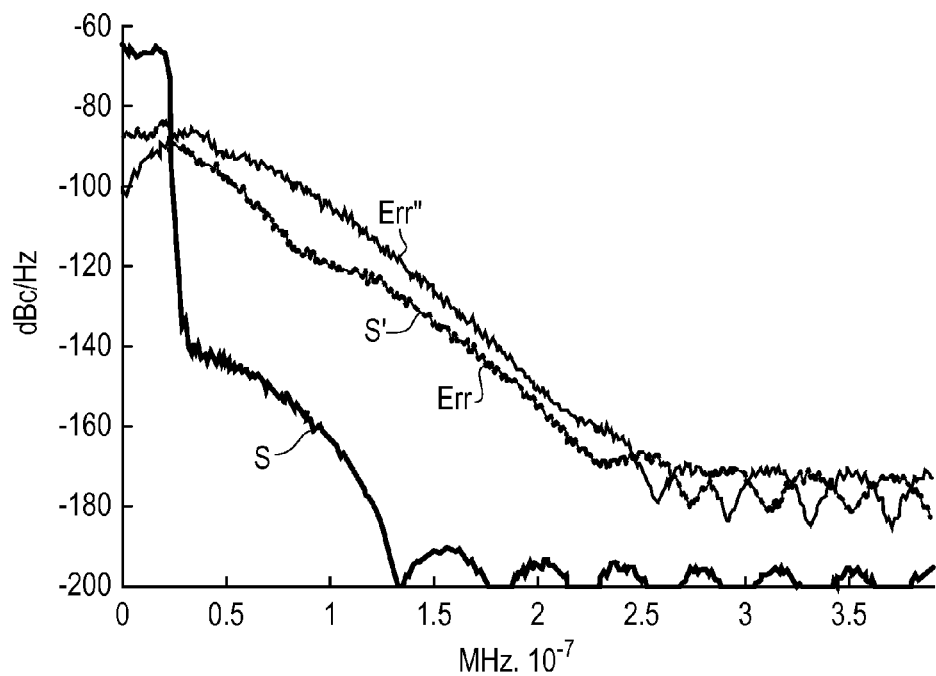
FIG. 9 is a graph illustrating spectra of a modulation signal, an error signal, a rotated error signal and a regenerated modulation signal.

FIG. 9 illustrates the spectra of the modulation signal S, the regenerated modulation signal S', the error signal Err and the rotated error signal Err", the latter three each having a relatively high power at high frequencies. In this example, the average power of the rotated error signal Err" is 20 dB lower than the average power of the modulation signal S.

At step 440, the second output signal AM* is generated which is proportional to the modulation signal S with its phase retarded by an angle equal to an integral of the first output signal FM_LP. This may be performed by summing the band-limited amplitude signal AM_LP, which is real, and the rotated error signal Err", which is complex, such that the second output signal AM* has a real part comprising the sum of the band-limited amplitude signal AM_LP and the real part of the rotated error signal Err", and an imaginary part comprising an imaginary part of the rotated error signal Err". Therefore, the summing step need sum only the band-limited amplitude signal AM_LP and the real part of the rotated error signal Err". The second output signal AM* may be represented as $$AM^* = AM\_LP + Err'' \qquad (4)$$
$$= S \cdot e^{-j\theta}$$
$$= (I + jQ) \cdot S \cdot e^{-j\theta}$$

Figure 10:
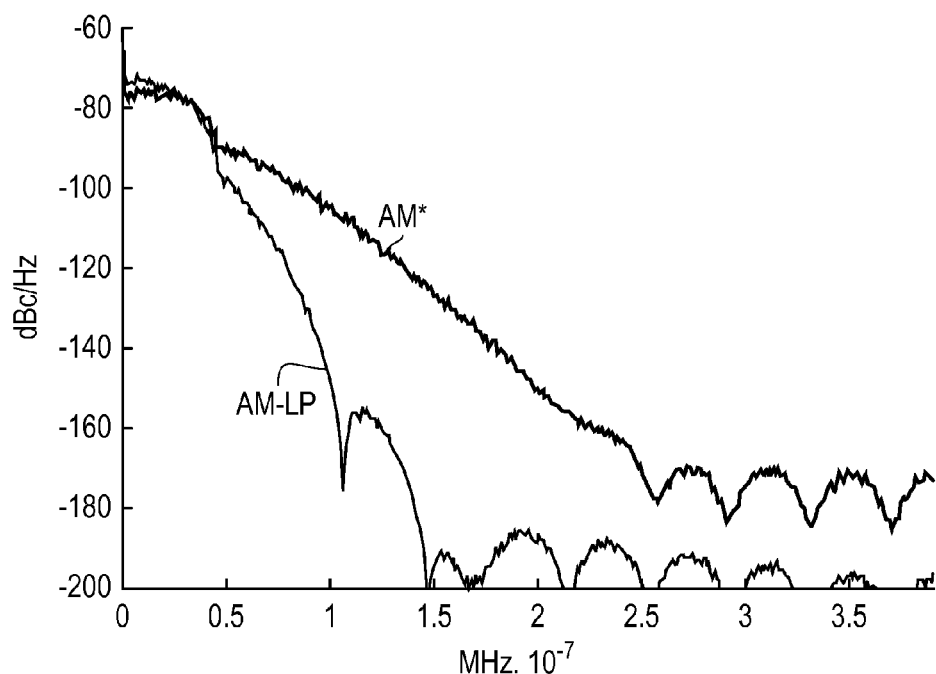
FIG. 10 is a graph illustrating spectra of the band-limited amplitude signal, a modulation signal, and of a second output signal.

FIG. 10 illustrates the spectra of the band-limited amplitude signal AM_LP and the second output signal AM*. The second output signal AM* is a complex signal with a small quadrature, or imaginary, part, as the band-limited amplitude signal AM_LP is real and the rotated error signal Err" is complex but relatively small. The steps 410 to 440 may be implemented by the modulation processor 500 described with reference to FIG. 6, or in computer program code embodied in a computer-readable storage medium. Indeed, steps 410 to 440, as a subset of the method of operating a modulator, together constitute a method of operating a modulation processor, such as the modulation processor 500.

At step 450, in the modulation stage 170, the frequency of the carrier signal is modulated dependent on the first output signal FM_LP and the amplitude of the carrier signal is modulated dependent on the second output signal AM*, or more specifically the real and imaginary parts of the second output signal AM*, to provide the modulated carrier signal RF. The modulation of the carrier signal by the first output signal FM_LP and the second output signal AM* is a non-linear operation, such that the bandwidth reduction can potentially cause degradation of the spectrum of the modulated carrier signal RF such that EVM and/or ACLR regulatory requirements may not be met, but such degradations are offset by employing the rotated error signal Err". Therefore, errors introduced when reducing the bandwidth of the amplitude and frequency signals can be cancelled in the summing stage 160 and in the modulation stage 170.

Figure 11:
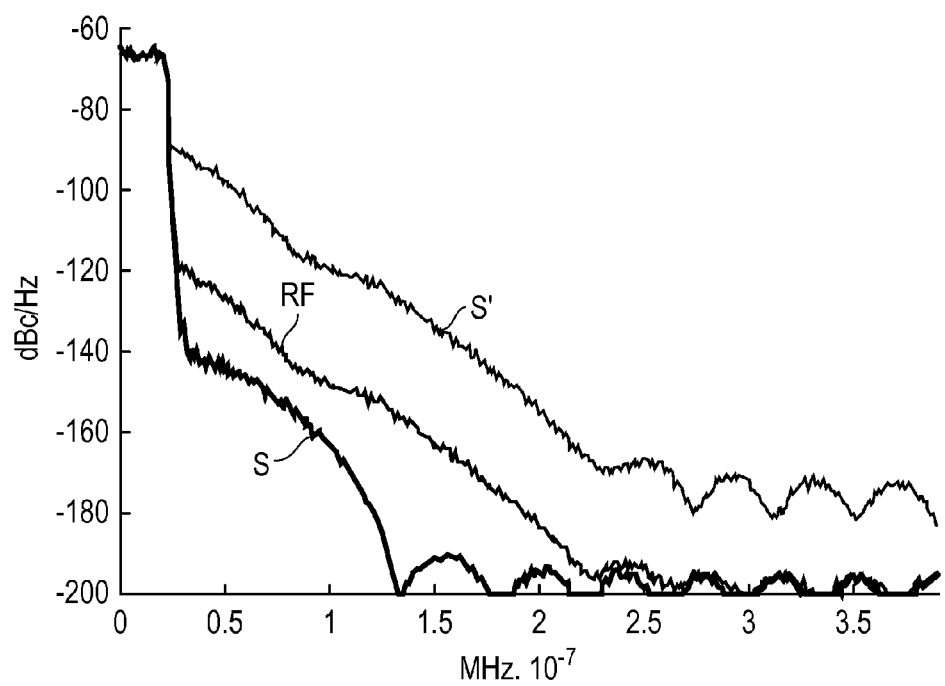
FIG. 11 is a graph illustrating spectra of a modulation signal, a regenerated modulation signal obtained by combining the band-limited amplitude signal and first output signal, and a modulated carrier signal obtained by employing the first and second output signals to modulate a carrier signal.

FIG. 11 illustrates the spectra of the modulation signal S, the regenerated modulation signal S', and the modulated carrier signal RF, the latter having an adjacent channel leakage ratio of −60 dBc, thereby providing a good margin with respect to the required level −33 dBc.

The spectra of the band-limited amplitude signal AM_LP, the first output signal FM_LP, the regenerated modulation signal S', the rotated error signal Err" and the second output signal AM* illustrated in FIGS. 8 to 11, correspond to a bandwidth reduction to 100 kHz by the first and second bandwidth reduction stages 113, 114, or at steps 430 and 432. The choice of bandwidth is a trade-off. A low bandwidth can result in a large error signal Err, which can lead to reduced efficiency by operating more in the inefficient I/Q domain. A large bandwidth at the first and second bandwidth reduction stages 113, 114 can result in a large bandwidth being required in subsequent stages to avoid introducing distortion, and can also require more precise cancellation in the error generation stage 140 and more precise matching between the first and second DACs 177, 178.

Figure 12:
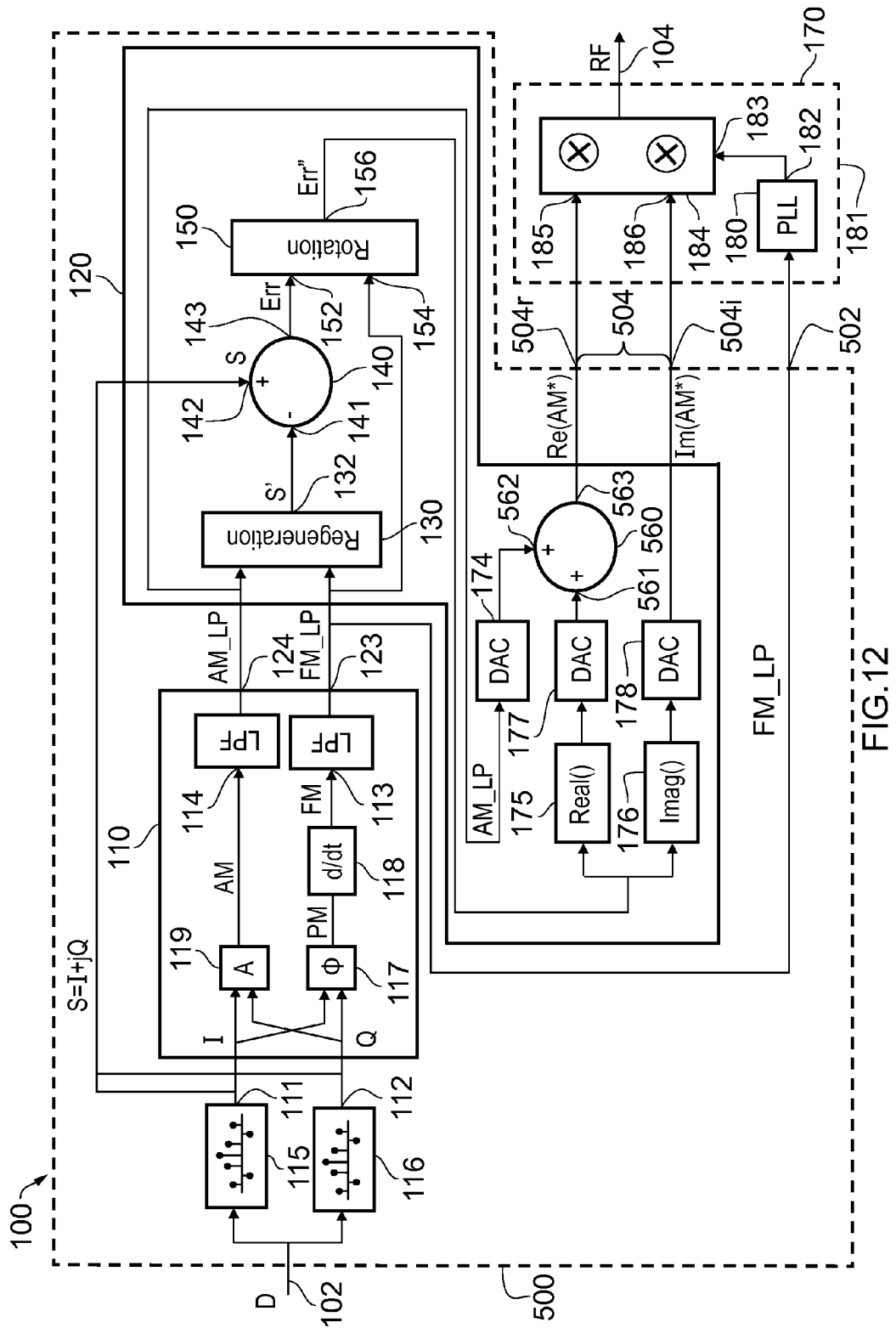
FIG. 12 is a block schematic diagram of a further embodiment of a modulator comprising a further embodiment of a modulation processor and a modulation stage.

Referring to FIG. 12, there is illustrated a modulator 100 comprising another embodiment of a modulation processor 500 and the modulation stage 170. The elements of the modulation processor 500 illustrated in FIG. 12 are identical to elements of the modulation processor 500 described with reference to FIG. 6 for the flow of modulation data D from the input 102 of the modulator 100 to the delivery of the rotated error signal Err" at the output 156 of the rotation stage 150. Such corresponding identical elements have the same reference numerals and are not described again. Also, the modulation stage 170 illustrated in FIG. 12 is identical to the modulation stage 170 illustrated in FIGS. 2 and 6, and so is not described again. In the following paragraphs, primarily the differences of the embodiment of FIG. 12, with respect to the embodiment of FIG. 6, are described.

Referring to FIG. 12, the output 156 of the rotation stage 150 is coupled to a first decomposition stage 175 which determines the real part of the rotated error signal Err", and to a second decomposition stage 176 which determines the imaginary part of the rotated error signal Err". An output of the first decomposition stage 175 is coupled to a first input 561 of a summing stage 560 by means of a first DAC 177, for delivering the real part of the rotated error signal Err". The second output 124 of the first processing stage 110 is coupled to a second input 562 of the summing stage 560 by means of a third DAC 174 for delivering the band-limited amplitude signal AM_LP. The summing stage 560 generates a real part of the second output signal AM* by summing the band-limited amplitude signal AM_LP, which is real, and the real part of the rotated error signal Err". An output 563 of the summing stage 560 is coupled to a first constituent output 504r of a port 504 of the modulation processor 500 for delivering the real part of the second output signal AM*, denoted Re(AM*) in FIG. 12.

An output of the second decomposition stage 176 is coupled to a second constituent output 504i of the port 504 of the modulation processor 500, by means of a second DAC 178, for delivering the imaginary part of the second output signal AM*, denoted Im(AM*) in FIG. 12, which is identical to the imaginary part of the rotated error signal Err", apart from the conversion from the digital domain to the analogue domain by the second DAC 178.

In the embodiment described with reference to FIG. 12, the real and imaginary parts of the rotated error signal Err" are relatively small and can have positive or negative values. Therefore, the first and second DACs 177,178 may have a relatively small dynamic range and can accommodate positive and negative values. In contrast, the band-limited amplitude signal AM_LP can be relatively large and can have only positive values. Therefore, the third DAC 174 may have a relatively large dynamic range, that is, a larger dynamic range than that of the first and second DACs 177, 178, and need accommodate only positive values. The first output 124 of the first processing stage 110 is also coupled to a third output 502 of the modulation processor 500 for delivering the first output signal FM_LP.

The first constituent output 504r of the port 504 of the modulation processor 500 is coupled to the first input 185 of the quadrature modulator 184 of the modulation stage 170 for delivering the real part of the second output signal AM*, and the second constituent output 504i of the port 504 of the modulation processor 500 is coupled to the second input 186 of the quadrature modulator 184 for delivering the imaginary part of the second output signal AM*. The third output 502 of the modulation processor 500 is coupled to the input 181 of a phase locked loop (PLL) 180 that modulates the frequency of a carrier signal by the first output signal FM_LP to provide a frequency modulated carrier signal at the output 182 of the PLL 180. The PLL 180 and the quadrature modulator 184 are elements of a modulation stage 170 as described with reference to FIG. 2, and arranged in the same manner, and operate in the same manner, as described with reference to FIG. 2. The embodiment of the phase locked loop 180 described with reference to FIG. 3 may be employed as the phase locked loop 180 illustrated in FIG. 12.

In a variation of the method of operating a modulator described with reference to FIG. 6, applicable to the modulator 100 described with reference to FIG. 12, at step 440, the second output signal AM* is generated which is proportional to the modulation signal S with its phase retarded by an angle equal to an integral of the first output signal FM_LP. This may be performed by summing the band-limited amplitude signal AM_LP and the real part of the rotated error signal Err", thereby generating the real part of the second output signal AM*, and delivering, as the imaginary part of the second output signal AM*, the imaginary part of the rotated error signal Err", converted to the analogue domain by the second DAC 178. In the embodiment of FIG. 12, this summing is performed in the analogue domain, after the real part of the rotated error signal Err" has been converted from the digital domain to the analogue domain by the first DAC 177, and the band-limited amplitude signal AM_LP has been converted from the digital domain to the analogue domain by the third DAC 174.

Although the modulation processor 500, the modulator 100, the method of operating a modulation processor and the method of operating a modulator have been described in relation to a wireless communication device and a transmitter for use in WCDMA and LTE, these may be employed in other wireless communication systems.

Although the modulation processor 500, the modulator 100, the method of operating a modulation processor and the method of operating a modulator have been described in relation to a wireless communication device, these can be used more generally in other applications requiring modulation.

The modulation processor 500, the modulator 100, the method of operating a modulation processor and the method of operating a modulator described herein may include additional, selectable modes of operation, such as a conventional polar modulation mode or a conventional rectangular, or I/Q, modulation mode, thereby enabling a choice of operating mode to adapt performance to prevailing requirements.

Other variations and modifications will be apparent to the skilled person. Such variations and modifications may involve equivalent and other features which are already known and which may be used instead of, or in addition to, features described herein. Features that are described in the context of separate embodiments may be provided in combination in a single embodiment. Conversely, features which are described in the context of a single embodiment may also be provided separately or in any suitable sub-combination.

It should be noted that the term "comprising" does not exclude other elements or steps, the term "a" or "an" does not exclude a plurality, a single feature may fulfil the functions of several features recited in the claims and reference signs in the claims shall not be construed as limiting the scope of the claims. It should also be noted that the Figures are not necessarily to scale; emphasis instead generally being placed upon illustrating the principles of the present invention.

The invention claimed is:

1. A modulation processor comprising a first processing stage and a second processing stage;
   wherein the first processing stage comprises:
      a phase generation stage arranged to generate a phase signal indicative of a phase of a modulation signal;
      a differentiation stage arranged to generate a frequency signal by differentiating the phase signal; and
      a first bandwidth reduction stage arranged to generate a first output signal by reducing a bandwidth of the frequency signal;
   wherein the second processing stage is arranged to generate an integral of the first output signal, retard the phase of the modulation signal by an angle equal to the integral, and generate a second output signal proportional to the modulation signal with its phase retarded.

2. The modulation processor of claim 1, wherein the phase generation stage is arranged to generate the phase signal from an in-phase component and a quadrature-phase component of the modulation signal.

3. The modulation processor of claim 1,
   wherein the first processing stage comprises:
      an amplitude generation stage arranged to generate an amplitude signal indicative of an amplitude of the modulation signal; and
      a second bandwidth reduction stage arranged to provide a band-limited amplitude signal by reducing a bandwidth of the amplitude signal;
   wherein the second processing stage comprises:
      a regeneration stage arranged to provide a regenerated modulation signal proportional to the band-limited amplitude signal with its phase advanced by an angle equal to the integral of the first output signal;
      an error generation stage arranged to generate an error signal indicative of a difference between the modulation signal and the regenerated modulation signal;
      a rotation stage arranged to provide a rotated error signal by retarding a phase of the error signal by the angle equal to the integral of the first output signal; and
      a summing stage arranged to sum the band-limited amplitude signal and a real part of the rotated error signal;
   wherein the second processing stage is arranged to deliver the second output signal having a real part comprising the sum of the band-limited amplitude signal and the real part of the rotated error signal, and an imaginary part comprising an imaginary part of the rotated error signal.

4. The modulation processor of claim 3, wherein the amplitude generation stage is arranged to generate the amplitude signal from an in-phase component and a quadrature-phase component of the modulation signal.

5. The modulation processor of claim 1, comprising a first digital-to-analog converter (DAC) arranged to convert a real part of the second output signal from the digital domain to the analog domain, and a second DAC arranged to convert an imaginary part of the second output signal from the digital domain to the analog domain, wherein the second DAC has a dynamic range smaller than a dynamic range of the first DAC.

6. The modulation processor of claim 3, comprising:
   a first digital-to-analogue converter (DAC) arranged to convert the real part of the rotated error signal from the digital domain to the analog domain;
   a second DAC arranged to convert the imaginary part of the rotated error signal from the digital domain to the analog domain; and
   a third DAC arranged to convert the band-limited amplitude signal from the digital domain to the analog domain;
   wherein the summing stage is coupled to the first and third DACs and is arranged to sum the band-limited amplitude signal and the real part of the rotated error signal in the analog domain; and
   wherein the first and second DACs have a dynamic range smaller than a dynamic range of the third DAC.

7. A modulator comprising the modulation processor of claim 1 and a modulation stage arranged to modulate a frequency of a carrier signal dependent on the first output signal and arranged to modulate the amplitude of the carrier signal dependent on the second output signal.

8. A transmitter comprising the modulator of claim 7.

9. A wireless communication device comprising the transmitter of claim 8.

10. A method of operating a modulation processor, comprising:
    generating a phase signal indicative of a phase of a modulation signal;
    generating a frequency signal by differentiating the phase signal;
    generating a first output signal by reducing a bandwidth of the frequency signal;
    generating an integral of the first output signal;
    retarding the phase of the modulation signal by an angle equal to the integral; and
    generating a second output signal proportional to the modulation signal with its phase retarded.

11. The method of claim 10, further comprising:
    generating an amplitude signal indicative of an amplitude of the modulation signal;
    providing a band-limited amplitude signal by reducing a bandwidth of the amplitude signal;
    providing a regenerated modulation signal proportional to the band-limited amplitude signal with its phase advanced by an angle equal to the integral of the first output signal;
    generating an error signal indicative of a difference between the modulation signal and the regenerated modulation signal;
    providing a rotated error signal by retarding a phase of the error signal by the angle equal to the integral of the first output signal;
    summing the band-limited amplitude signal and a real part of the rotated error signal; and
    delivering the second output signal having a real part comprising the sum of the band-limited amplitude signal and the real part of the rotated error signal, and an imaginary part comprising an imaginary part of the rotated error signal.

12. The method of claim 10, further comprising:
converting a real part of the second output signal from the digital domain to the analog domain by means of a first digital-to-analog converter (DAC);
converting an imaginary part of the second output signal from the digital domain to the analog domain by means of a second DAC;
wherein the second DAC has a dynamic range smaller than a dynamic range of the first DAC.

13. The method of claim 11, further comprising:
converting the real part of the rotated error signal from the digital domain to the analog domain by means of the first digital-to-analog converter (DAC);
converting the imaginary part of the rotated error signal from the digital domain to the analog domain by means of the second DAC;
converting the band-limited amplitude signal from the digital domain to the analog domain by means of a third DAC; and
performing the summing of the band-limited amplitude signal and the real part of the rotated error signal in the analog domain;
wherein the first and second DACs each have a dynamic range smaller than a dynamic range of the third DAC.

14. The method of operating a modulator, comprising the method of claim 10, and further comprising modulating the frequency of a carrier signal dependent on the first output signal, and modulating the amplitude of the carrier signal dependent on the second output signal.

15. A non-transitory computer-readable storage medium storing a program product comprising computer program code operative to cause a processor to perform the steps of:
generating a phase signal indicative of a phase of a modulation signal;
generating a frequency signal by differentiating the phase signal;
generating a first output signal by reducing a bandwidth of the frequency signal;
generating an integral of the first output signal;
retarding the phase of the modulation signal by an angle equal to the integral; and
generating a second output signal proportional to the modulation signal with its phase retarded.

* * * * *